United States Patent [19]
Vallauri et al.

[11] Patent Number: 5,492,740
[45] Date of Patent: * Feb. 20, 1996

[54] ENCLOSURE ASSEMBLY FOR USE OVER ELONGATE CYLINDRICAL OBJECTS SUCH AS ELECTRIC CABLE SPLICES

[75] Inventors: Ubaldo Vallauri, Monza; Francesco Portas, Quattordio; Bruno Parmigiani, Milan, all of Italy

[73] Assignee: Pirelli Cavi S.p.A., Milan, Italy

[ * ] Notice: The portion of the term of this patent subsequent to Jan. 23, 2013, has been disclaimed.

[21] Appl. No.: 335,199

[22] Filed: Nov. 7, 1994

Related U.S. Application Data

[63] Continuation of Ser. No. 972,154, Nov. 5, 1992, abandoned.

[30] Foreign Application Priority Data

Nov. 8, 1991 [IT] Italy ................... MI91A2982

[51] Int. Cl.⁶ .................. F16L 11/00; H01B 7/00
[52] U.S. Cl. .................. 428/34.9; 428/35.1; 428/37; 428/906; 174/73.1; 174/DIG. 8
[58] Field of Search .................. 174/DIG. 8, 73.1; 428/34.9, 35.1, 35.2, 906, 37

[56] References Cited

U.S. PATENT DOCUMENTS

| | | | |
|---|---|---|---|
| 3,488,431 | 1/1970 | Nixon | 174/DIG. 8 |
| 3,620,896 | 11/1971 | Glasgow | 174/DIG. 8 |
| 3,691,505 | 9/1972 | Graves | 174/DIG. 8 |
| 3,847,183 | 11/1974 | Meyer | 174/DIG. 8 |
| 3,946,480 | 3/1976 | Dienes | 29/235 |
| 4,016,356 | 4/1977 | McLoughlin | 174/DIG. 8 |
| 4,389,440 | 6/1993 | Keith | 174/DIG. 8 |
| 4,431,861 | 2/1984 | Clabburn et al. | 428/34.9 |
| 4,503,105 | 3/1985 | Tomioka | 428/36.9 |
| 4,871,599 | 10/1989 | Knorr | 428/34.9 |
| 5,087,492 | 2/1992 | Vallauri et al. | 428/34.9 |

FOREIGN PATENT DOCUMENTS

| | | |
|---|---|---|
| 0435569 | 12/1990 | European Pat. Off. |
| 2643755 | 2/1990 | France |
| 9002070 | 6/1990 | Germany |
| 1292608 | 10/1972 | United Kingdom |
| 2099638 | 12/1982 | United Kingdom |

*Primary Examiner*—Ellis P. Robinson
*Assistant Examiner*—Rena L. Dye
*Attorney, Agent, or Firm*—Brooks Haidt Haffner & Delahunty

[57] ABSTRACT

The enclosure assembly, being particularly but not exclusively conceived for use over electric cable splices, comprises a sleeve of an elastomer material, a support whereover the sleeve is fitted in a condition of elastic expansion, said sleeve being adapted to shrink around the elongate cylindrical objects upon removal of the support. The support comprises two substantially cylindrical, tubular bodies having ends abutted coaxially with each other in mutual continuation relationship; the abutted ends are disposed at substantially inward locations of the sleeve longitudinal extension. Thus, the support removal can begin from a predetermined internal region of the sleeve; the sleeve starts shrinking over the splice within said internal region, and any axial deformations in the sleeve would leave the sleeve positioning relatively to said predetermined internal region unaffected.

8 Claims, 2 Drawing Sheets

ENCLOSURE ASSEMBLY FOR USE OVER ELONGATE CYLINDRICAL OBJECTS SUCH AS ELECTRIC CABLE SPLICES

This application is a continuation of application Ser. No. 07/972,154 filed Nov. 5, 1992, which is now abandoned.

BACKGROUND OF THE INVENTION

1. Field of the Invention

This invention relates to an enclosure assembly for use on elongate cylindrical objects.

More specifically, the invention is directed to sheathing sleeves intended for application over cable splices, or cable ends, in medium- to high-voltage power lines where the high electric potentials involved, being on the order of tens or hundreds kV in magnitude, require that air inclusions be totally absent from between the sleeve inner surface and the outer surface of a cable to be sheathed.

It is understood, however, that the enclosure assembly of this invention may be also employed for applications other than the above-outlined one, for instance over cylindrical objects of various description—such as pipes, rods, stems, and the like—e.g. to provide local protection against corrosion or else.

2. Description of the Related Art

As is known, in splicing electric cables together, it is common practice to remove locally protective and insulating members from around the conductor of either cable, at the ends of the cables to be spliced together, for connection to the conductor of the other cable.

After filling with appropriate materials (jointing compounds, self-amalgamating tapes, or the like) the gaps left by the removal of insulative and/or protective members, the spliced bare ends of the two cables are covered with a sheathing sleeve of an elastomer material which provides the necessary protection and insulation for proper performance of the splice.

The elastomer sleeve is preliminarly fitted, in a condition of elastic expansion, over a tubular cylinder body made of a rigid plastics material to be engaged around either cable prior to splicing.

Subsequently, after the conductors have been spliced to each other, the tubular body is removed from the elastomer sleeve, thereby allowing the sleeve to shrink elastically about the cables at the splice.

In a prior device, disclosed in Italian Patent Application 28578 A/88 and European Patent Application EP 89120585.8, the tubular cylinder body is removed by slipping it axially off the elastomer sleeve with the aid of appropriate tooling.

Another prior art device, as disclosed in Patent GB 1,292,608, provides a support consisting of a tubular cylinder body wherever an elastic covering is fitted. The tubular body is formed with a helical groove around its outer surface. In this way, a continuous strip is substantially created on the tubular cylinder body in the form of a plurality of turns laid consecutively and being set close against one another along a weakening line of reduced thickness which is defined at the bottom of the helical groove.

By exerting a pull force on a free end portion of the strip which extends from one of the turns at the tubular body ends and longitudinally across the body, the turns are progressively separated along said weakening line. Thus, the tubular cylinder body can be removed from the elastic covering by a simple manual operation requiring no special puller.

U.S. Pat. No. 4,503,105 provides a helical groove cut through the thickness of the tubular body. The individual turns are interconnected by longitudinal bridge formations on the tubular body interior whose thickness is only partly affected by the helical groove depth.

European Patent EP 0 291 203 discloses instead a tubular body wherein a plurality of through-going cutouts, set closely apart in a helical pattern, are formed using a suitable tool operated on the outer surface of the cylindrical body.

A further known support, shown in U.S. Pat. No. 4,389,440, has the tubular cylinder body formed by a band-like element which is wound helically into a plurality of side-by-side turns bonded to one another. Here again, by exerting a pull force on an extended portion of the band-like element laid longitudinally across the tubular body, the tubular body is caused to collapse as the turns come progressively apart.

It has been found that, for high values (200–300%) of radial deformation of the sleeve fitted over the support, axial deformations appear in the sleeve upon release thereof; that is, as the support is being removed, the sleeve not only shrinks elastically in the radial direction but also changes in length along the longitudinal direction.

The extent of said longitudinal deformation varies in a not easily foreseeable fashion, it being dependent on the materials utilized, the amount of radial deformation imparted, the amount of radial shrinkage of the sleeve—tied, in turn, to the size of the cables fitted with the sleeve, the way the sleeve is expanded on the support, the length of time that the expanded sleeve has been kept in store, etc.

The foregoing considerations bring out the difficulty of ensuring proper positioning of the elastic sleeve over the cable junction area, especially where particular dimensional limitations and tolerances exist, or in the presence of elements to be placed at the locations of some particular members of the spliced cables, internally of the sleeve.

Specifically, in one embodiment, the sleeves may be provided with an internal electric field deflector, or electrode, consisting of an annular portion of a semiconductive elastomer material; such an element, which is to be given specified shape and dimensions for the application on hand, should locate precisely in the central region of the splice, at the bare conductor portions connected by the clamp, such that said region can be shielded electrically, and the electric field nullified to make the presence of air and clamp irregularities ("peak" effects) ineffectual.

Improper positioning of the deflector relatively to the clamp would thwart its action and may develop electric field concentrations apt to result in the splice being pierced through.

In an alternative embodiment, in lieu of the deflector, the sleeve may have a layer of a field-control material; however, that embodiment also requires that the sleeve be accurately positioned especially as regards the ends of said field-control layer.

On the other hand, it is quite impractical to rely on the operator's skill for the solution of such problems, because the operator would be substantially unable to alter the position of the deflector or the sleeve at the installation stage of the sleeve on the cables, or to change it after shrinking.

In accordance with this invention, it has been found that a possibility of control lies in that region of the sleeve which is first shrunk onto the cable insulator at the portion of the support to be removed initially. In fact, that region of the sleeve would be shrunk onto the underlying cable, at its positioning, with such force that it can be moved no more.

It has been found, therefore, that the sleeve positioning can be significantly improved by having a selected internal region, preferably the middle region, shrunk first, rather than a peripheral region of the splice.

SUMMARY OF THE INVENTION

This invention relates to an enclosure assembly for elongate cylindrical objects, comprising a sleeve made of an elastomer material, a support whereover the sleeve is fitted in a condition of elastic expansion, said sleeve being adapted to shrink over the elongate cylindrical objects upon removal of the support, characterized in that the support comprises two substantially cylindrical, tubular bodies having ends abutted coaxially against each other in mutual continuation relationship, the abutted ends being disposed at substantially inward locations with respect to the longitudinal dimension of the sleeve.

In this way, the support removal can start from a predetermined inward region of the splice, thereby the sleeve begins to be shrunk around the splice at that inward region, and axial deformations of the sleeve will leave the position of the sleeve relatively to said predetermined inward region unaffected. In addition, the overall axial deformation is split along either directions from the inward region, thereby sleeve positioning errors would also be split accordingly.

Preferably, the abutted ends of the tubular bodies are located such that, upon initial removal of either tubular body, the sleeve begins to shrink at a selected location.

Since it will be generally preferred to ensure maximum positioning accuracy in the central region of the cylindrical bodies protected with the sleeve (e.g., in the instance of electric cables on the conductor connection), it is preferred that the abutted ends of the tubular bodies be positioned at a substantially central location substantially mid-way between opposite ends of the sleeve along the longitudinal dimension of the sleeve fitted over the tubular bodies.

Actually, due to the diameter differential, which may become significant, between the expanded state and the shrunk state of the sleeve, the condition whereby the sleeve is initially shrunk at the precise location of the abutted ends of the support tubular bodies would only occur with the two tubular bodies being removed simultaneously.

Since, in practice, this would hardly be the case due to the sleeve being difficult to hold stationary during removal, initial shrinking occurs at a location somewhat removed from the location of the abutted ends of the tubular bodies, on the side of the tubular body to be removed first.

The amount of this displacement (or error) is, however, quite small, and may be conveniently neglected.

However, for highly critical applications, claiming due consideration of the foregoing, it is contemplated that the sleeves may have the two tubular bodies abutted with their ends at a different location for a predetermined value of the target position where the sleeve should begin to shrink. Such sleeves are conveniently marked to enable recognition by the installer both of the exact position of the sleeve for initial shrinking at the desired location and of which tubular body should be removed first.

The tubular bodies may be any type; in particular, they may be rigid pipes to be slipped off opposite ends of the sleeve, one after the other using the same procedures and equipment as with conventional sleeves. However, it is preferred that both tubular bodies, or at least one of them, be formed of a strip of a strong flexible material wound into a helix with mutually bonded contiguous turns of a strip, the turns being then separable by application of a pull force to one end of the strip along a substantially longitudinal direction. In fact, this tubular body type is the easiest to pull off by the installer.

For each of the tubular bodies comprised of a helically wound strip, there is provided a strip pulling means mounted to the tubular body end lying inside the sleeve.

Preferably, said pulling means comprises an end portion of the strip separated from the adjacent turns and extending along a substantially axial direction through the tubular body interior and out through the opposite end of the tubular body. Alternatively, the pulling means may comprise a flexible band attached to an end portion of the strip and extending along a substantially axial direction through the tubular body interior and out through the opposite end of the tubular body. The last-mentioned approach may be preferable on account of the smaller radial bulk of the band; this would admit, for the same inside diameter of the support, of larger diameter cables, thereby reducing the radial expansion to be imparted to the sleeve.

Advantageously, the tubular body strips are wound helically in the same winding direction. This is a preferred condition because it enables the ends of the two tubular bodies to be brought virtually into end contact with each other; this provides a support the outer surface of which shows minimum discontinuity, thereby the likelihood of permanent deformations being induced in the inner surface of the sleeve during storage of the splice can be minimized.

BRIEF DESCRIPTION OF THE DRAWINGS

Further features and advantages of a support according to the invention will be more clearly understood from the following detailed description of a preferred embodiment thereof, to be read with reference to the accompanying drawings, in which.

DESCRIPTION OF THE PREFERRED EMBODIMENT

Figure 1:
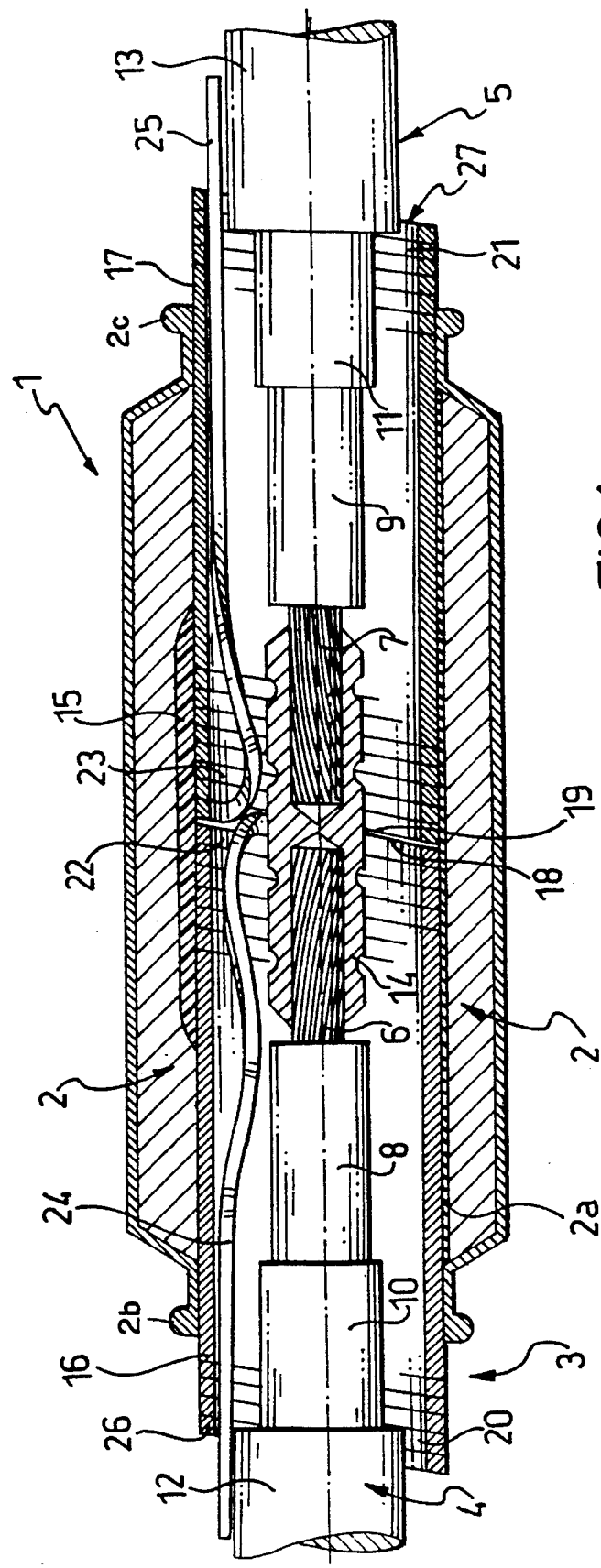
FIG. 1 is a sectional view showing schematically an enclosure assembly according to the invention as fitted over two electric cables spliced together prior to removing the support.

In the drawing views, generally shown at 1 is an enclosure assembly comprising a radially stretched sleeve 2 of elastic material, the bore of said sleeve having an inner wall of a predetermined radius in its unstretched state and said sleeve having opposite ends 2b and 2c, and said sleeve being fitted in an elastically expanded state over a support 3 for the purpose of protecting a splice between two electric cables 4 and 5, e.g. medium-voltage (10–30 kV) cables.

The cables 4 and 5 comprise respective conductors 6 and 7 covered with respective insulators 8 and 9; on the insulator exterior, there are normally provided capacitive shields 10 and 11 made of a semiconductor material and protective outer sheaths 12 and 13.

At the location of the splice between the electric cables 4 and 5, all of said members of cables 4 and 5 are removed sequentially as shown in FIG. 1; the dimensions of the bare portions of each member are specified by relevant standards, such as French Standard EDF HN 68-S-08, June 1987. The bare portions of the conductors 6 and 7 are spliced to each other, either by means of a metal clamp 14 to be clamped tight around the conductors 6 and 7, or by soldering, or else.

The sleeve 2 is formed from an elastomeric material having elastic and electrical characteristics contingent on its intended application.

Specifically, this sleeve 2, as intended for the aforesaid medium-voltage applications, has a number of coaxial layers, the innermost of which, indicated at 2*a*, is preferably an elastomer material of the field-control variety, that is capable of attenuating progressively the strength of the electric field in the splice area, as illustrated by the lower portion of FIG. 1. The ends of this layer 2*a* must be located precisely with respect to the ends of the shields 10, 11, if the layer 2*a* is to perform its intended function.

Alternatively, or additionally to said inner layer—as well as for use with high voltages (up to a few hundreds kVolts)—there may be provided a deflector 15 of a semiconductive material, also referred to as the "electrode", in the form of a suitably shaped body; this deflector is depicted in the upper portion of FIG. 1.

The deflector 15 is effective to smooth the electric field in the area around the clamp 14 where the conductors 6, 7 have been divested of their respective insulators 8, 9, and prevent formation of high-gradient regions where discharges could result in failure of the assembly 1.

To this aim, in the assembled state of the sleeve 2, the deflector 15 should locate over the clamp 14 precisely at the ends of the insulators 8 and 9 so as to cover a section, preferably at least 4 mm long, of the insulators.

The support 3 comprises two tubular bodies 16 and 17 disposed within the bore of sleeve 2, which are substantially cylindrical in shape, each of said bodies having a longitudinal axis, having an external surface around said axis of a radius greater than the predetermined radius of sleeve 2 and engaging the inner wall of sleeve 2 to cause radial stretching of said sleeve and having an internal surface around said axis of a radius smaller than the radius of said external surface, said bodies having opposite ends and being mounted coaxially with one end 18 of said body 16 abutting the end 19 of said body 17 intermediate the opposite ends of sleeve 2. The tubular bodies 16 and 17 have substantially the same axial dimension.

The tubular bodies 16 and 17 are each comprised of a respective strip 20, 21 made of a strong flexible plastics material laid into a helix having interconnected adjacent turns 22, 23 the interconnection of each adjacent turn being comprised of severable means securing each turn to an adjacent turn and said turns of said bodies being made of a material of dimensions which provides a radial resistance to the pressure applied thereto by the stretched sleeve sufficient to maintain said sleeve in its stretched state. This construction may be obtained, for example, by forming a helical groove in a tubular stock such that the material left from the groove-cutting process creates a bond between the turns; alternatively, this same construction can be obtained using some other methods, known per se, like forming a sequential set of through-going cuts along a helical line around a tubular body or winding a strip material into a helix with adjacent turns bonded together.

The tubular bodies 16 and 17 can be progressively removed from within the sleeve 2 by exerting on the strip 20, 21 a pull effective to release progressively adjacent turns 22, 23, which are then taken out to allow the sleeve 2 to shrink elastically around the underlying cables 6, 7.

In order to permit of the application of said pull force, the support 3 is provided with a strip terminating means, also referred to herein as a pulling means for pulling away the strip 20, 21 and removing the support 3 starting with the end 18, 19 of each tubular body 16, 17.

Figure 2:
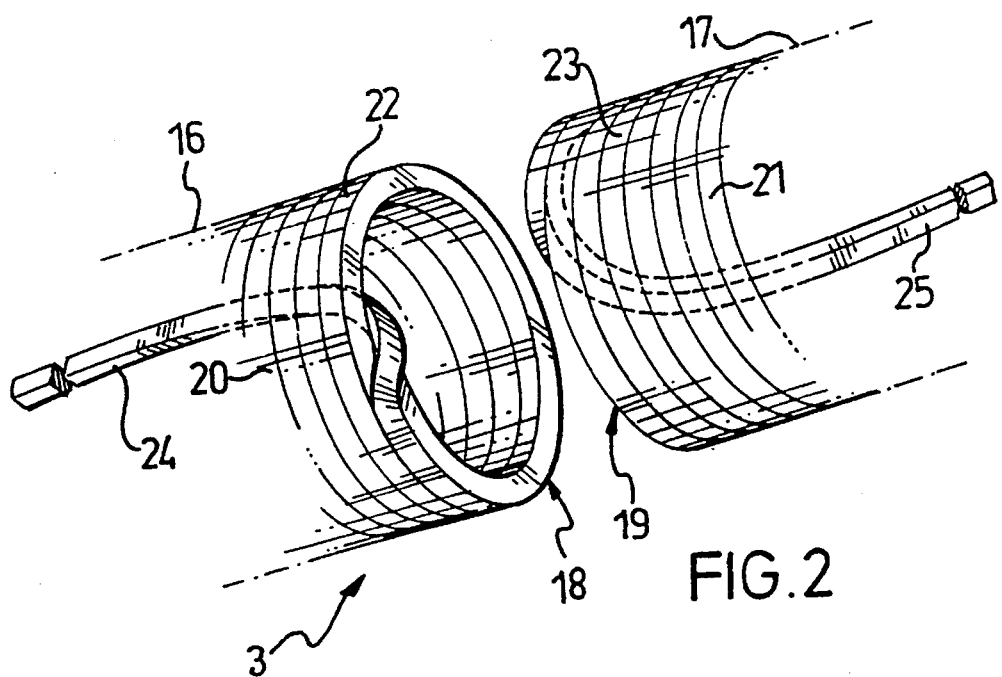
FIG. 2 is a fragmentary perspective view of the support in the enclosure assembly shown in FIG. 1.

In a first variant illustrated by FIGS. 1 and 2, the pulling means comprises an end portion 24, 25 of the strip 20, 21 which is not wound helically but allowed to extend loose along a substantially axial direction inside the tubular body 16, 17 and out through the opposite end 26, 27 of the tubular body.

Figure 3:
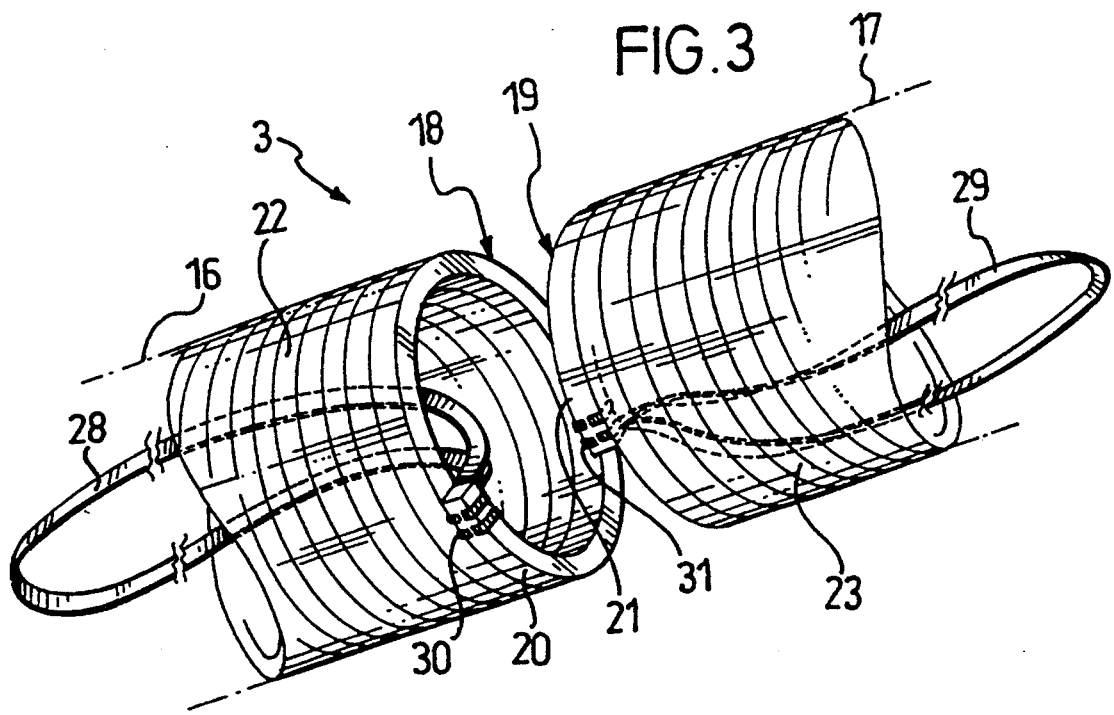
FIG. 3 is a fragmentary perspective view of a modified embodiment of the support in FIG. 2.

In a second variant illustrated by FIG. 3, the pulling means comprises a respective band 28, 29 which may be an open or closed loop (as shown) and is secured to an end turn of the supporting body at the end of the supporting body which abuts the other body by means of clips 30 and 31 or attached to the strip 20, 21, and extends along a substantially axial direction inside the tubular body 16, 17 and out through the opposite end 26, 27 of the tubular body.

The coil turns 22 and 23 of the two tubular bodies 16 and 17 are preferably identical with one another, and in particular, wound in the same helical direction. Thus, the two tubular bodies 16 and 17 can be abutted against each other with the turns 22 of tubular body 16 following the turns 23 of tubular body 17 with minimal discontinuity therebetween.

The appearance of a gap, from the volume of the end portions 24, 25 of the strip 20, 21 bent inwardly of the tubular bodies 16, 17, is acceptable in the central region of the sleeve 2, however, because any break in its inner surface, due to an amount of permanent deformation in the forming material, would be aligned to the location of the clamp 14, that is locate in a region where the electric field is less strong and no risk of piercing the dielectric exists.

Installation of the enclosure assembly 1 according to the invention is carried out as follows.

After processing the ends of cables 4 and 5 to be spliced together in conformity with applicable standards and regulations for the specific cable type on hand, as previously discussed, the enclosure assembly 1, together with the support 3 and the sleeve 2 fitted thereover in a condition of elastic expansion, is slipped over one of the cables 4 or 5 and run axially all the way to a position overlying the outer sheath 12 or 13.

Then, with the prepared ends of the cables 4, 5 so cleared, the conductors 6 and 7 are spliced together and the internal parts of the splice dressed with fillers, compounds and the like, as required.

Thereafter, the enclosure assembly 1 is moved into its installation area and adjusted to its desired position relatively to the clamp 14 and/or the various successive elements of the cables 4, 5.

For this purpose, reference markings may be provided on the sleeve 2, such as a reference to indicate its mid-point or any other position of interest; based on such reference, longitudinal positioning of the enclosure assembly 1 with respect to the spliced cables 4, 5 can be effected and maintained more easily.

With one end of the support 3, e.g. end 26, held firmly in place on the cable 4—either manually or using some appropriate equipment—to ensure that the sleeve 2, and in particular its central region, is aligned to the target position, a pull is exerted on the corresponding pulling means, that is the portion 24 of strip 20 or the band 28, depending on the embodiment of choice.

By so doing, the tubular body 16 will be removed from within the sleeve 2, progressively from the middle region of the sleeve 2 out; as a result, the sleeve 2 is allowed to shrink onto the clamp 14 and the insulator 8 of cable 4 underneath, at the location of the middle region of the splice.

The middle region of the sleeve 2 will, therefore, shrink over the insulator with desired longitudinal accuracy, unaffected by any uncontrolled or unforeseeable longitudinal deformation undergone by the sleeve 2.

As the pull is maintained on the portion 24, the tubular body 16 comes fully out of the sleeve 2 interior, whilst the sleeve remains shrunk around the end of the cable 4, axially immovable thereon.

Subsequently, a pull is applied to the portion 25 of strip 21 or the band 29, depending on the respective embodiments, to result in removal of the tubular body 17 and completion of the sleeve 2 shrinkage around the splice 3 at the desired location.

It matters to observe that any error in the positioning of the opposite ends of the sleeve 2, as brought about by axial expansion of the sleeve, would be split in a substantially even manner between the two ends, and hence be in absolute value one half that occurring with a conventional support.

It should be also noted as a further major advantage that the strip 20, 21 can in no way bring harm to any compounds or self-amalgamating tapes used to fill gaps around the clamp 14 at an earlier stage than the application of the sleeve 2. In fact, the strip 20, 21 is pulled out toward one end of the splice from the central region thereof; any rubbing contact of the strip with the ends of the cables 4, 5 would, therefore, take place substantially away from the middle region where said compounds may be present.

As a final consideration, an enclosure assembly according to the invention could also be used, as mentioned hereinabove, in applications other than that just described, e.g. on a variety of cylindrical objects such as pipes, rods, stems, and the like, wherever a demand for accurate positioning exists.

We claim:

1. An assembly of an elastic sleeve with a supporting body in the bore of said sleeve for the application of said sleeve to a cylindrical body, said assembly comprising:

a radially stretched sleeve of elastic material, the bore of said sleeve having an inner wall of a predetermined radius in its unstretched state and said sleeve having opposite ends;

a support comprising two tubular bodies disposed within the bore of said sleeve, each of said bodies having a longitudinal axis, having an external surface around said axis of a radius greater than said predetermined radius and engaging said inner wall of said sleeve to cause radial stretching of said sleeve and having an internal surface around said axis of a radius smaller than the radius of said external surface, said bodies having opposite ends and being mounted co-axially with one end of a first one of said bodies abutting the end of the other second one of said bodies intermediate said ends of said sleeve and in mutual continuation; and a pair of pulling means, one of said pulling means being connected to said one end of first one of said bodies and extending within the internal surface of said first one of said bodies toward the opposite end of said first one of said bodies and the other of said pulling means being connected to said one end of said second one of said bodies and extending within the internal surface of said second one of said bodies toward the opposite end of said second one of said bodies.

2. An assembly as set forth in claim 1 wherein said one end of said first one of said bodies abuts said one end of said second one of said bodies substantially mid-way between said opposite ends of said sleeve.

3. An assembly as set forth in claim 1 wherein each of said bodies is formed by a plurality of helically wound, contiguous turns of a strip, severable means securing each turn to an adjacent turn and said turns of said body being made of a material of dimensions which provides a radial resistance to the pressure applied thereto by the stretched sleeve sufficient to maintain said sleeve in its stretched state and each of said pulling means is a pull strip extending from a turn at one end of said body within said internal surface for pulling said turns apart and pulling the turns of one said body away from the turns of the other said body.

4. An assembly as set forth in claim 3 wherein each of said pulling means comprises a strip terminating means secured to an end turn of the supporting body at the end of the supporting body which abuts the other body.

5. An assembly as set forth in claim 4 wherein said strip terminating means comprises a flexible band extending from said end turn within said internal surface and at least to the end of said supporting body opposite from the end thereof which abuts the other body.

6. An assembly as set forth in claim 3 wherein the strips of each body are wound in the same helical direction.

7. An assembly as set forth in claim 3 wherein the abutting ends of the bodies contact each other over at least major portions of the abutting end surfaces.

8. An assembly as set forth in claim 2 wherein said sleeve has an innermost layer of semi-conductive material.

\* \* \* \* \*